US012734837B2

(12) United States Patent
Araishi

(10) Patent No.: US 12,734,837 B2
(45) Date of Patent: Sep. 15, 2026

(54) IMAGE FORMING APPARATUS

(71) Applicant: KYOCERA Document Solutions Inc., Osaka (JP)

(72) Inventor: Kuniaki Araishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 239 days.

(21) Appl. No.: 18/819,902

(22) Filed: Aug. 29, 2024

(65) Prior Publication Data

US 2025/0074091 A1 Mar. 6, 2025

(30) Foreign Application Priority Data

Aug. 30, 2023 (JP) ................................ 2023-140258

(51) Int. Cl.
*B41J 25/308* (2006.01)

(52) U.S. Cl.
CPC ........ *B41J 25/3088* (2013.01); *B41J 2202/20* (2013.01)

(58) Field of Classification Search
CPC .......................... B41J 25/3088; B41J 2202/20
See application file for complete search history.

(56) References Cited

U.S. PATENT DOCUMENTS

2006/0132573 A1 6/2006 Nishida
2007/0127090 A1* 6/2007 Nonaka .............. H04N 1/00612 358/498
2013/0038663 A1* 2/2013 Obata .................... B41J 25/308 347/37

FOREIGN PATENT DOCUMENTS

JP 2006168318 A 6/2006

* cited by examiner

*Primary Examiner* — Justin Seo
(74) *Attorney, Agent, or Firm* — Alleman Hall LLP

(57) ABSTRACT

Housing includes: pair of side plates; two reference shafts; and two support plates suspended from one end portion of each of two reference shafts and fixed to one of side plates; conveying unit includes two adjustment shafts fixed at same height and spaced same distance apart from each other as distance between two reference shafts; one end portion of each of two adjustment shafts is supported by other side plate at certain distance in vertical direction below other end portion of each of two reference shafts; other end portion of one of adjustment shafts is supported by one of support plates at position in vertical direction below one end portion of reference shaft and spaced apart from one end portion of reference shaft; and other end portion of other adjustment shaft is supported by other support plate so as to be able to move in up-down direction.

3 Claims, 9 Drawing Sheets

IMAGE FORMING APPARATUS

INCORPORATION BY REFERENCE

This application is based upon and claims the benefit of priority from the corresponding Japanese Patent Application No. 2023-140258 filed on Aug. 30, 2023, the entire contents of which are incorporated herein by reference.

The present disclosure relates to an image forming apparatus including a conveying unit.

BACKGROUND

An inkjet type image forming apparatus according to related art includes a conveying unit that conveys a recording medium along a predetermined conveying direction, and an inkjet head that ejects ink onto the recording medium being conveyed. In order to obtain good image quality, it is necessary to maintain a constant distance between the recording medium conveyed by the conveying unit and an ink ejection surface of the inkjet head. The conveying unit has a predetermined length along the conveying direction, and thus in a case in which the distance between an upstream side and a downstream side in the conveying direction differs, color deviation occurs.

In an image forming apparatus according to the related art, a conveying belt unit (corresponding to the conveying unit) is supported at four points along a horizontal plane by side plates of a housing. Three of the four points are directly fixed to the side plates, and the remaining point is supported by the side plate so as to be adjustable in height. In this way, by fixing the three points to achieve flatness and then adjusting the remaining one point, the conveying belt unit can be supported by the housing without twisting or distortion.

SUMMARY

In order to solve the problem described above, an image forming apparatus according to the present disclosure includes: a conveying unit configured to convey a recording medium along a predetermined conveying direction, and a housing configured to detachably support the conveying unit; wherein the housing includes: a pair of side plates arranged opposite to each other in a direction crossing the conveying direction; two reference shafts fixed at a same height and spaced at a distance apart from each other in the conveying direction between the pair of side plates; and two support plates suspended from one end portion of each of the two reference shafts and fixed to one of the side plates; the conveying unit includes two adjustment shafts fixed at a same height and spaced the same distance apart from each other as the distance between the two reference shafts; one end portion of each of the two adjustment shafts is supported by the other side plate at a certain distance in the vertical direction below the other end portion of each of the two reference shafts; the other end portion of one of the adjustment shafts is supported by one of the support plates at a position in the vertical direction below the one end portion of the reference shaft and spaced apart from the one end portion of the reference shaft; and the other end portion of the other adjustment shaft is supported by the other support plate so as to be able to move in an up-down direction.

According to the present disclosure, one of the side plates has an opening through which the conveying unit is inserted and removed in a front-rear direction; and the two support plates may overlap a portion of the opening.

According to the present disclosure, the other support plate may include: an adjustment member supported so as to be rotatable in the up-down direction; and a screw configured to rotate the adjustment member relative to the support plate; and the other end portion of the other adjustment shaft may be supported by the adjustment member, and may be able to move in the up and down direction by rotating the screw to rotate the adjustment member.

According to the present disclosure, even in a case in which the conveying unit is inserted or removed from the housing along the front-rear direction, the conveying unit can be supported horizontally at three points by providing left and right support plates that overlap part of the opening. Therefore, the conveying unit can be supported by the housing without twisting or distortion, thereby preventing color deviation.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an image forming apparatus of an embodiment according to the present disclosure will be described with reference to the drawings.

Figure 1:
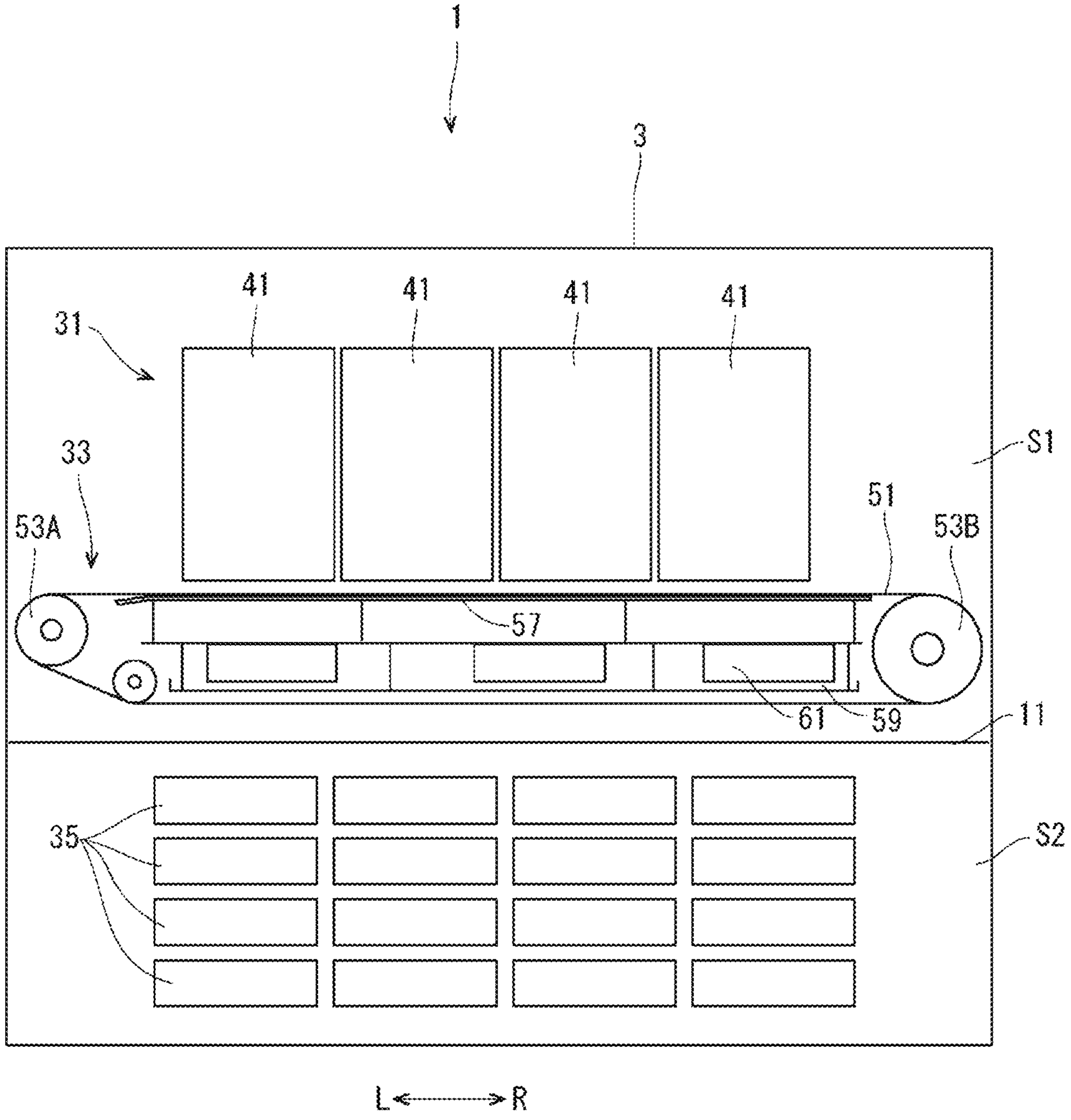
FIG. 1 is a front view schematically showing an internal configuration of an image forming apparatus of an embodiment according to the present disclosure.

First, an overall configuration of an image forming apparatus 1 will be described with reference to FIG. 1. FIG. 1 is a front view schematically showing an inner portion of the image forming apparatus 1. In each figure, L, R, Fr, and Rr indicate left, right, front, and rear, respectively.

The image forming apparatus 1 is an inkjet type image forming apparatus that forms an image by ejecting ink. The image forming apparatus 1 includes a housing 3 having a rectangular parallelepiped hollow portion.

Figure 2A:
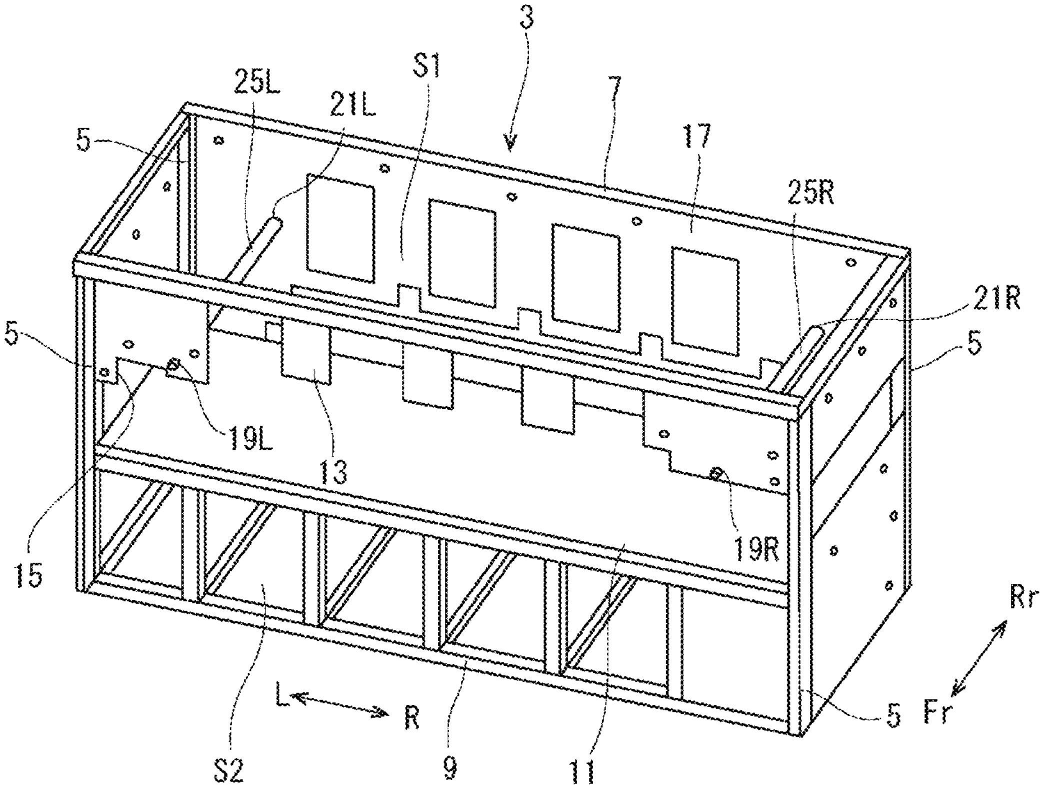
FIG. 2A is a perspective view as seen from the front of a housing of an image forming apparatus of an embodiment according to the present disclosure.
Figure 2B:
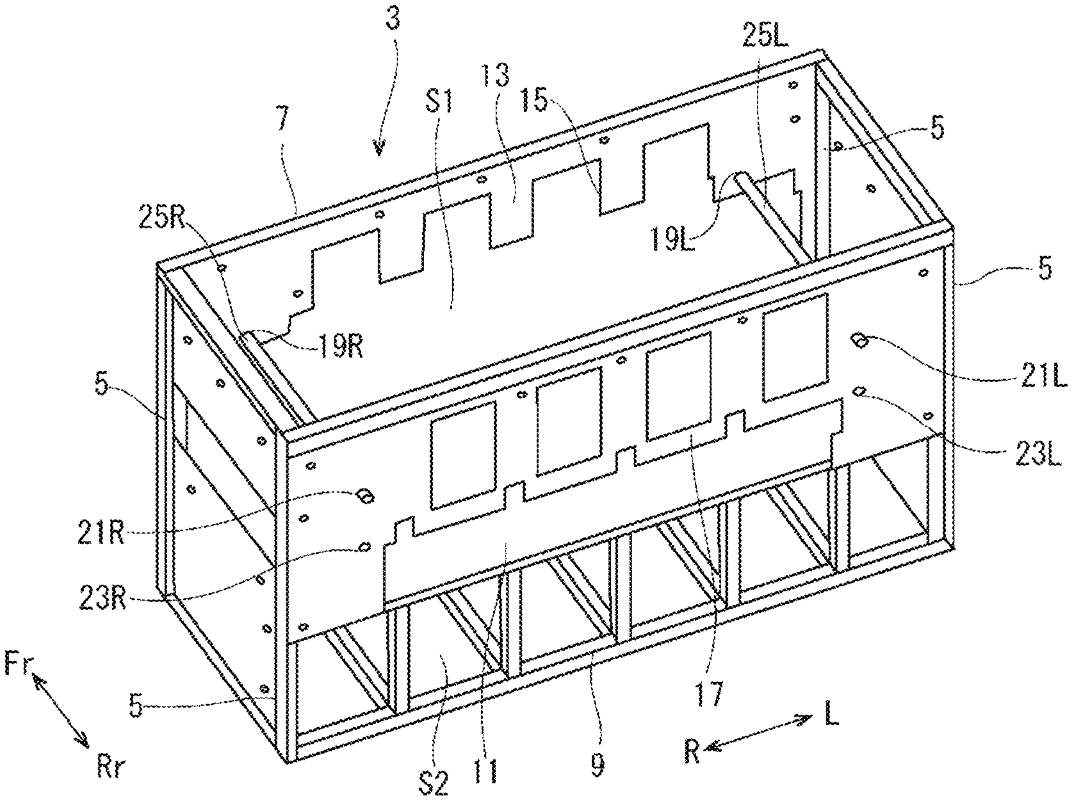
FIG. 2B is a perspective view as seen from the rear of a housing of an image forming apparatus of an embodiment according to the present disclosure.

First, the housing 3 will be described with reference to FIG. 2A and FIG. 2B. FIG. 2A and FIG. 2B are perspective views showing the housing 3. The housing 3 has four support pillars 5 arranged at each of four corners (front left corner, front right corner, rear left corner, and rear right corner) of the hollow portion, a rectangular upper frame body 7 connected to upper ends of the four support pillars 5, and a rectangular lower frame body 9 connected to lower ends of the four support pillars 5. The hollow portion is divided into an upper hollow portion S1 and a lower hollow portion S2 by a partition plate 11 along a horizontal plane (see also FIG. 1).

A front side plate 13 is fixed to a front surface of the upper hollow portion S1. More specifically, the front side plate 13 is fixed to the upper frame body 7 and to the two front support pillars 5. An opening 15 is formed in the front side plate 13. A rear side plate 17 is fixed to a rear surface of the upper hollow portion S1. More specifically, the rear side plate 17 is fixed to the upper frame 7, to the two rear support pillars 5, and to the partition plate 11. In this way, the front side plate 13 and the rear side plate 17 face each other in the front-rear direction. Note that the housing 3 has a bottom plate, a right side plate fixed between the right support pillars 5, and a left side plate fixed between the left support pillars 5. A detailed description of these will be omitted.

Left and right upper through holes 19L, 19R are formed at the same height at the left and right end portions of the front side plate 13. Left and right upper through holes 21L, 21R are formed at the left and right end portions of the rear side plate 17 at the same height as the left and right upper through holes 19L, 19R of the front side plate 13. The left upper through hole 19L and the left upper through hole 21L are arranged coaxially along the front-rear direction. The right upper through hole 19R and the right upper through hole 21R are arranged coaxially along the front-rear direction.

In addition, as shown in FIG. 2B, left and right lower through holes 23L, 23R are formed at left and right end portions of the rear side plate 17 vertically below the left and right upper through holes 21L, 21R with the same distance between them.

A left reference shaft 25L is suspended between the left upper through hole 19L and the left upper through hole 21L. A right reference shaft 25R is suspended between the right upper through hole 19R and the right upper through hole 21R. The left and right reference shafts 25L, 25R (collectively referred to as reference shafts 25) are stepped shafts having small diameters at both end portions. In other words, the front and rear end portions of the left reference shaft 25L are inserted into the left upper through hole 19L and the left upper through hole 21L, and the front and rear end portions of the right reference shaft 25R are inserted into the right upper through hole 19R and the right upper through hole 21R. In this way, the left and right reference shafts 25L, 25R are fixed at the same height in a position perpendicular to the front and rear side plates 13, 17 and parallel to each other.

Referring again to FIG. 1, a head unit 31 and a conveying unit 33 are housed in the upper hollow portion S1 of the housing 3. The head unit 31 is housed in an upper portion of the upper hollow portion S1, and the conveying unit 33 is housed in a lower portion of the upper hollow portion S1. In the lower hollow portion S2 of the housing 3, for example, ink containers and cleaning liquid containers 35 are housed.

The head unit 31 will be described. The head unit 31 includes four inkjet heads 41 corresponding to yellow, black, cyan, and magenta inks. The inkjet head 41 includes three recording heads (not shown). The four inkjet heads 41 are arranged at predetermined intervals in the left-right direction.

Each recording head has a large number of nozzles (not shown) through which ink is supplied, and a piezoelectric element (not shown) provided for each nozzle. Ejection ports of the large number of nozzles are open on a bottom surface of the recording head. When the piezoelectric element is driven, ink in the nozzle is ejected downward from the ejection port.

Figure 3:
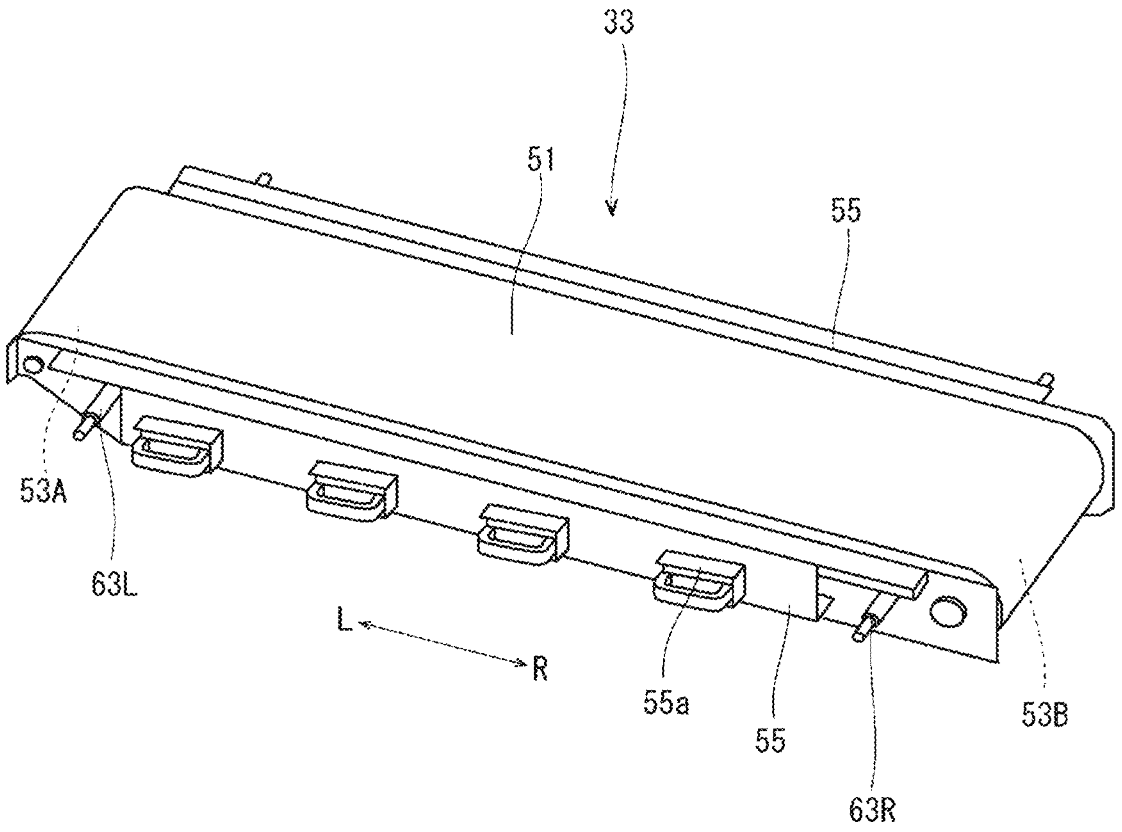
FIG. 3 is a perspective view illustrating a conveying unit of an image forming apparatus of an embodiment according to the present disclosure.

Next, the conveying unit 33 will be described with reference to FIG. 1 and FIG. 3. FIG. 3 is a perspective view showing the conveying unit 33. The conveying unit 33 includes an endless conveying belt 51, a drive roller 53A, and a driven roller 53B around which the conveying belt 51 is wound. The conveying belt 51 has a large number of through holes formed so as to penetrate in the thickness direction. The drive roller 53A and the driven roller 53B are rotatably supported by front and rear side plates 55 (see FIG. 3, not shown in FIG. 1). Handles 55*a* are formed on the front side plate 55. The rotation of the drive roller 53A causes the conveying belt 51 to run in the counterclockwise direction in FIG. 1 and FIG. 3. The recording medium is conveyed in the conveying direction from right to left in FIG. 1 and FIG. 3 by the conveying belt 51 that travels along an upper running track.

As shown in FIG. 1, a conveying plate 57, a plurality of suction chambers 59, and a plurality of suction devices 61 are arranged in the hollow portion of the conveying belt 51. The conveying plate 57 is arranged between both rollers 53A, 53B so as to come in contact with the inner surface of the conveying belt 51 that runs along the upper running track. The conveying plate 57 is provided with a large number of through holes penetrating in the thickness direction. The plurality of suction chambers 59 are arranged below the conveying plate 57 along the conveying direction. The suction devices 61 are arranged in the suction chambers 59 and generate a negative pressure in the suction chambers 59. When there is negative pressure in the suction chamber 59, negative pressure is generated in the through holes of the conveying plate 57 and the through holes of the conveying belt 51 that runs along the upper running track, and the recording medium is attracted to the conveying belt 51.

As shown in FIG. 3, left and right adjustment shafts 63L, 63R (collectively referred to as adjustment shafts 63) extend between the left end portions and the right end portions of the front and rear side plates 55, respectively. The left and right adjustment shafts 63L, 63R are fixed at the same height in parallel orientation with each other perpendicular to the front and rear side plates 55. The adjustment shafts 63 are stepped shafts having smaller diameters at both end portions.

The conveying unit 33 is accommodated in the lower portion of the upper hollow portion S1 of the housing 3 (below the head unit 31) via the opening 15 (see FIG. 2A and FIG. 2B) in the front side plate 13 of the housing 3, and is removably supported by the front side plate 13 and rear side plate 17 of the housing 3 via the left and right adjustment shafts 63L and 63R.

Figure 4:
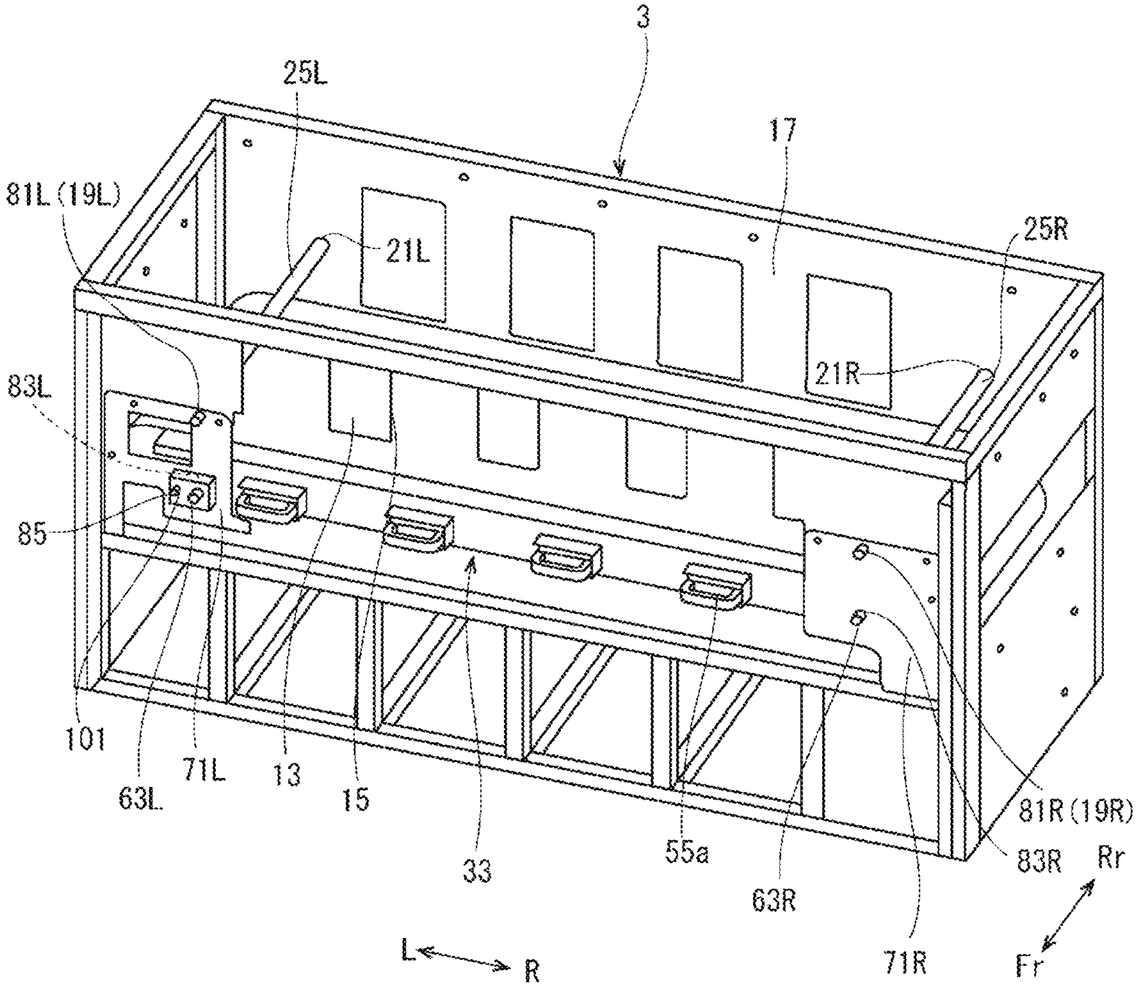
FIG. 4 is a perspective view as seen from the front side of a housing supporting a conveying unit in an image forming apparatus of an embodiment according to the present disclosure.
Figure 5:
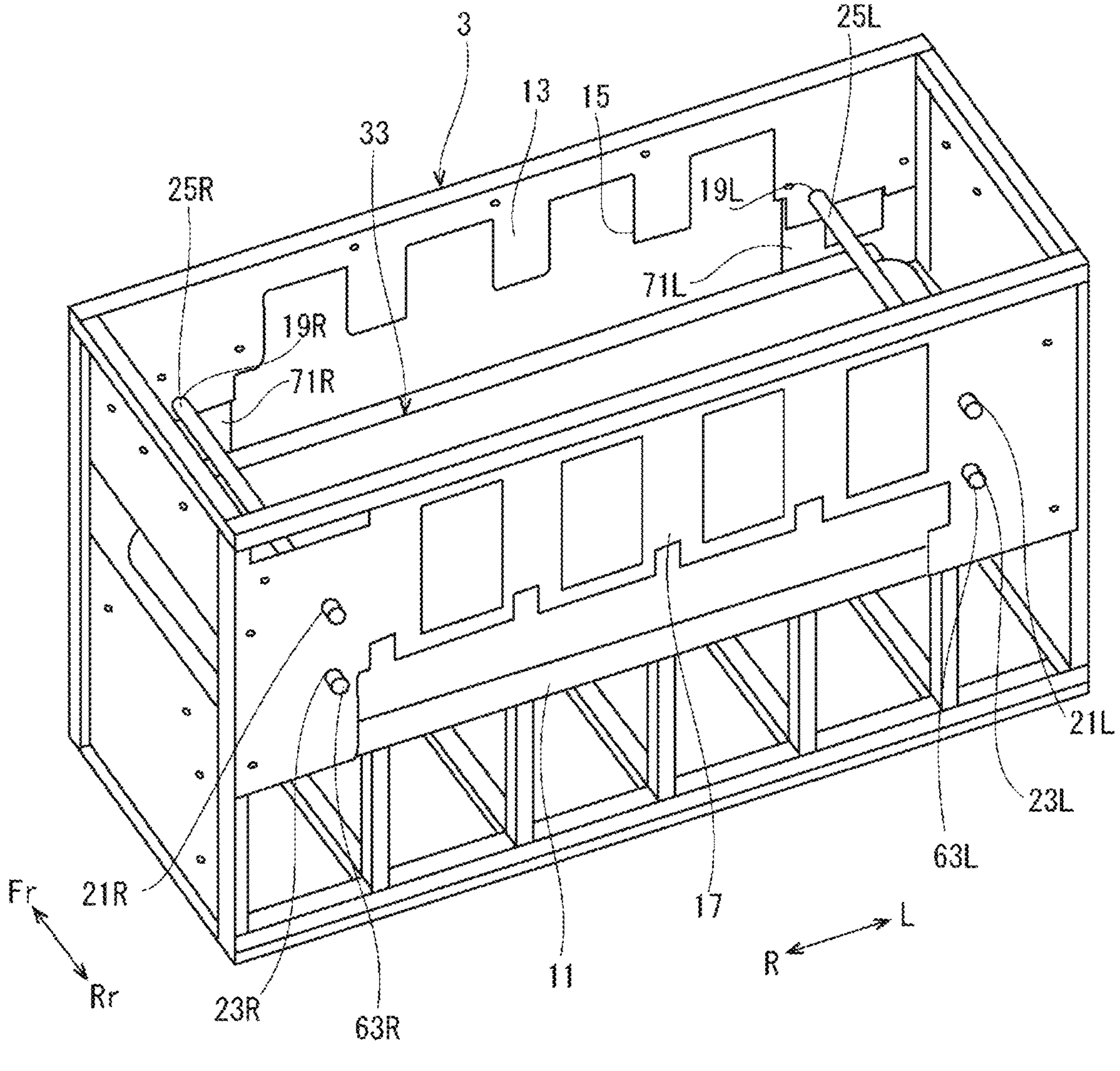
FIG. 5 is a perspective view as seen from the rear side of a housing supporting a conveying unit in an image forming apparatus of an embodiment according to the present disclosure.
Figure 6A:
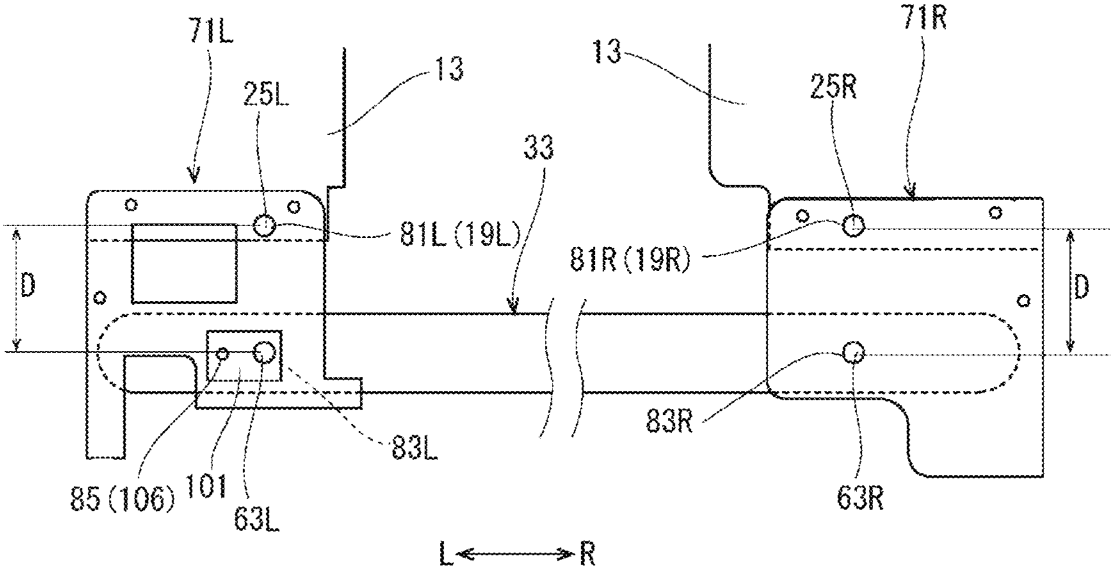
FIG. 6A is a front view showing a positional relationship between a reference shaft and an adjustment shaft in an image forming apparatus of an embodiment according to the present disclosure.
Figure 6B:
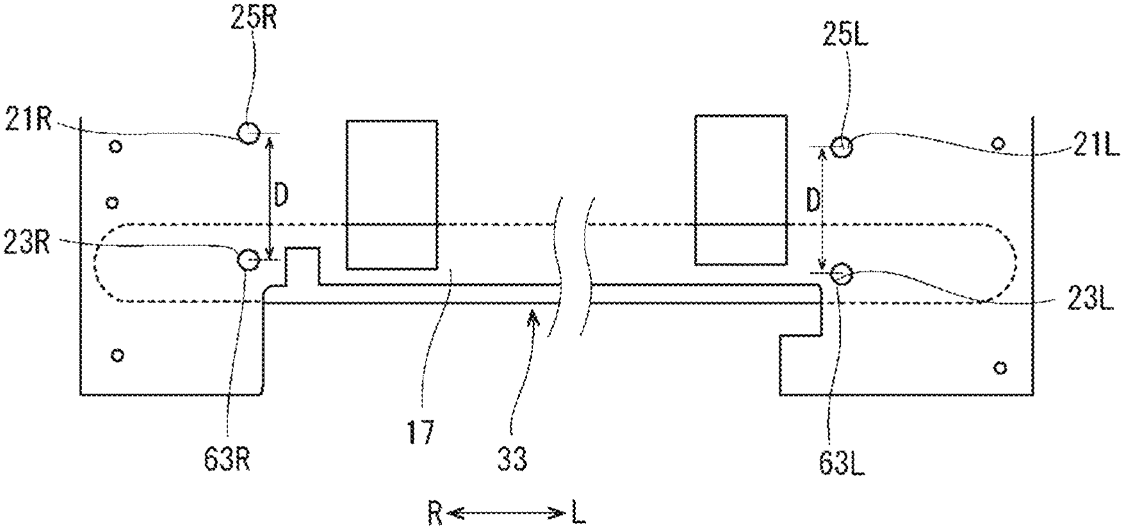
FIG. 6B is a rear view showing a positional relationship between a reference shaft and an adjustment shaft in an image forming apparatus of an embodiment according to the present disclosure.

Next, the conveying unit 33 supported by the housing 3 will be described with reference to FIG. 4, FIG. 5, FIG. 6A and FIG. 6B. FIG. 4 is a perspective view of the housing 3 supporting the conveying unit 33 as seen from the front side, and FIG. 5 is a perspective view of the housing 3 supporting the conveying unit 33 as seen from the rear side. FIG. 6A and FIG. 6B are diagrams for explaining a positional relationship between the reference shafts 25 and the adjustment shafts 63.

As shown in FIG. 5, the rear end portions of the left and right adjustment shafts 63L, 63R are inserted into the left and right lower through holes 23L, 23R formed in the rear side plate 17 of the housing 3. On the other hand, as shown in FIG. 4, the front end portions of the left and right adjustment shafts 63L, 63R are supported on the front side plate 13 of the housing 3 via left and right support plates 71L, 71R (collectively referred to as support plates 71), respectively.

The left and right support plates 71L, 71R will now be described. First, the right support plate 71R will be described with reference to FIG. 4 and FIG. 6A. The right support plate 71R has a substantially rectangular shape, and has upper and lower through holes 81R, 83R formed therein. The diameter of the upper through hole 81R is equal to the diameter of the front end portion of the right reference shaft 25R of the housing 3, and the diameter of the lower through hole 83R is equal to the diameter of the front end portion of the right adjustment shaft 63R of the conveying unit 33. As shown in FIG. 6A, a distance D between the upper and lower through holes 81R, 83R is equal to a distance D between the right upper and lower through holes 21R, 23R formed in the rear side plate 17 of the housing 3 (see FIG. 6B).

As shown in FIG. 4 and FIG. 6A, the right support plate 71R is suspended from the front end portion of the right reference shaft 25R protruding from the upper through hole 19R of the front side plate 13 of the housing 3. In other words, by inserting the front end portion of the right reference shaft 25R into the upper through hole 81R of the right support plate 71R, the right support plate 71R is suspended from the front end portion of the right reference shaft 25R. Furthermore, the front end portion of the right adjustment shaft 63R of the conveying unit 33 is inserted into the lower through hole 83R of the right support plate 71R. Thus, the weight of the conveying unit 33 itself causes the front end portion of the right adjustment shaft 63R and the front end portion of the right reference shaft 25R to be aligned vertically. In a state in which the right support plate 71R is suspended from the front end portion of the right reference shaft 25R, the right support plate 71R is fastened to the front side plate 13 of the housing 3 and the support pillar 5. At this time, as shown in FIG. 6A, the right support plate 71R overlaps with a portion (right end portion) of the opening 15 of the front side plate 13.

In this way, by aligning the front end portion of the right adjustment shaft 63R and the front end portion of the right reference shaft 25R vertically, the front end portion and rear end portion of the right adjustment shaft 63R are positioned at the same height (a height that is a distance D below the upper through hole 19R of the front side plate 13 and the upper through hole 21R of the rear side plate 17 in the vertical direction). Furthermore, as described above, the rear end portion of the left adjustment shaft 63L is inserted into the left lower through hole 23L formed in the rear side plate 17 of the housing 3. The lower through hole 23L is formed at a height that is a distance D below the upper through hole 21L in the vertical direction. Therefore, the rear end portion of the left adjustment shaft 63L is also positioned at the same height as the front end portion and the rear end portion of the right adjustment shaft 63R.

Next, the left support plate 71L will be described with reference to FIG. 4 and FIG. 6A. The left support plate 71L has a substantially rectangular shape, and has upper and lower through holes 81L, 83L formed therein. The diameter of the upper through hole 81L is equal to the diameter of the front end portion of the left reference shaft 25L of the housing 3, and the diameter of the lower through hole 83L is larger than the diameter of a washer 105 (described later) attached to the front end portion of the left adjustment shaft 63L of the conveying unit 33. As shown in FIG. 6A, the distance D between the upper and lower through holes 81L, 83L is equal to the distance D between the left upper and lower through holes 21L, 23L (see FIG. 6B) formed in the rear side plate 17 of the housing 3.

Furthermore, a pin 85 extending forward is formed on the left support plate 71L on the left side of the lower through hole 83L.

The left support plate 71L is suspended from the front end portion of the left reference shaft 25L that protrudes from the upper through hole 19L of the front side plate 13 of the housing 3. In other words, by inserting the front end portion of the left reference shaft 25L into the upper through hole 81L of the left support plate 71L, the left support plate 71L is suspended from the front end portion of the left reference shaft 25L. Furthermore, the front end portion of the left adjustment shaft 63L of the conveying unit 33 is inserted into the lower through-hole 83L of the left support plate 71L. The front end portion of the left adjustment shaft 63L protrudes from the lower through hole 83L and is supported by the left support plate 71L via an adjustment member 101.

Figure 7A:
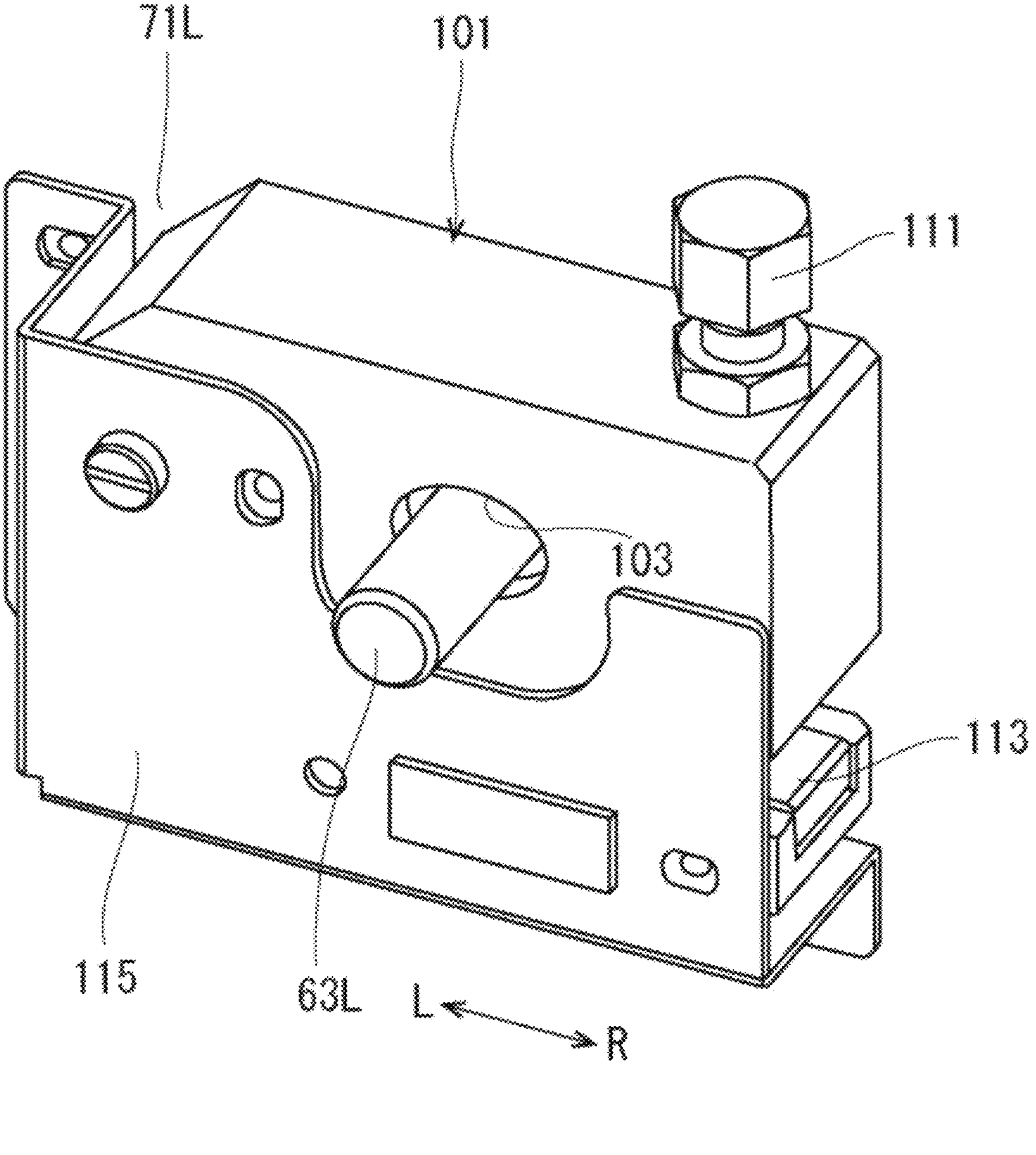
FIG. 7A is a perspective view showing an adjustment member in an image forming apparatus of an embodiment according to the present disclosure.
Figure 7B:
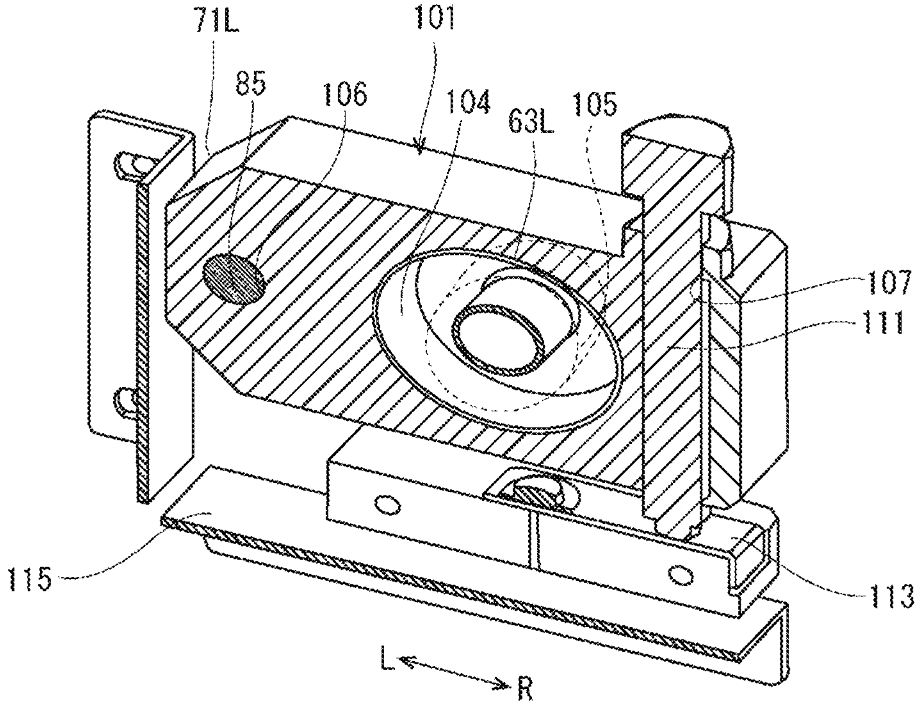
FIG. 7B is a cross-sectional perspective view showing an adjustment member in an image forming apparatus of an embodiment according to the present disclosure.

Next, the adjustment member 101 will be described with reference to FIG. 7A and FIG. 7B. FIG. 7A is a perspective view showing the adjustment member 101, and FIG. 7B is a cross-sectional perspective view showing the adjustment member 101. The adjustment member 101 is a rectangular parallelepiped member having substantially rectangular front and rear surfaces, upper and lower side surfaces, and left and right side surfaces.

On the front surface and the rear surface, a front through hole 103 and a rear through hole 104, both of which are long holes extending horizontally and have different diameters, are formed in a stepped shape in the axial direction on the same axis along the front-rear direction. The front end portion of the left adjustment shaft 63L protruding from the lower through hole 83L of the left support plate 71L is inserted into the front through hole 103 and the rear through hole 104. More specifically, as shown in FIG. 7B, a cylindrical washer 105 having a larger diameter than the front end portion of the left adjustment shaft 63L protruding from the lower through hole 83L of the left support plate 71L is coaxially fitted to the front end portion of the left adjustment shaft 63L. The washer 105 is inserted into the rear through hole 104. As shown in FIG. 7A, the front end portion of the left adjustment shaft 63L protrudes from the washer 105 and protrudes forward through the front through hole 103.

The adjustment member 101 has a fulcrum through hole 106 on the left side of the front and rear through holes 103, 104 that penetrates from the front surface to the rear surface, and the fulcrum through hole 106 is rotatably supported by the pin 85 formed on the left support plate 71L (see FIG. 4 and FIG. 6A). In addition, on the right side of the front and rear through holes 103, 104, a screw hole 107 is provided that penetrates from the top surface to the bottom surface. A screw 111 is screwed into the screw hole 107 from above. The lower end portion of the screw 111 protrudes downward from the lower side plate.

A substantially horizontal fixed piece 113 is fixed to the left support plate 71L below the adjustment member 101. The lower end portion of the screw 111 that is screwed into the screw hole 107 of the adjustment member 101 comes in contact with the fixed piece 113. When the screw 111 is rotated in a screwing direction, the adjustment member 101 rises relative to the fixed piece 113 and rotates upward about the pin 85. On the other hand, when the screw 111 is rotated in a loosening direction, the adjustment member 101 lowers relative to the fixed piece 113 and rotates downward about the pin 85.

As the adjustment member 101 rotates in this manner, the front end portion of the left adjustment shaft 63L moves in the up-down direction within the lower through hole 83L of the left support plate 71L, together with the washer 105 engaged with the rear through hole 104 of the adjustment member 101.

In addition, a cover plate 115 that covers a portion of a front surface of the adjustment member 101 and left and lower surfaces is fixed to the left support plate 71L.

As described above, the left support plate 71L is suspended from the front end portion of the left reference shaft 25L protruding from the upper through hole 19L of the front side panel 13 of the housing 3. Thus, the weight of the conveying unit 33 itself causes the front end portion of the left adjustment shaft 63L and the front end portion of the left reference shaft 25L to be aligned vertically. In a state in which the left support plate 71L is suspended from the front end portion of the left reference shaft 25L, the left support plate 71L is fastened to the front side plate 13 of the housing 3 and the support pillar 5. At this time, the left support plate 71 L overlaps a part (left end portion) of the opening 15 of the front side plate 13 of the housing 3.

A method for adjusting the horizontality of the conveying unit 33 in the image forming apparatus 1 having the above configuration will be described. As described above, the front end portion and the rear end portion of the right adjustment shaft 63R and the rear end portion of the left adjustment shaft 63L of the conveying unit 33 are positioned at the same height. Therefore, the conveying unit is fixed to the housing 3 at three points (the front end portion and rear end portion of the right adjustment shaft 63R and the rear end portion of the left adjustment shaft 63L) on the same horizontal plane.

In an image forming apparatus according to related art, the conveying belt unit is supported by the housing via an opening in the top surface of the housing. Therefore, it is relatively easy to support three points along a horizontal plane. However, there are also cases in which the conveying belt unit is supported by the housing through an opening in the front surface of the housing. This case cannot be handled.

The technique according to the present disclosure takes into consideration the above circumstances and aims to provide an image forming apparatus that can support a conveying unit without twisting or distortion relative to the housing, even in a case in which the conveying unit is supported by the housing through an opening in the front surface of the housing.

On the other hand, the front end portion of the left adjustment shaft 63L is inserted into the lower through hole 83L of the left support plate 71L. The diameter of the lower through hole 83L is larger than the diameter of the washer 105 attached to the front end portion of the left adjustment shaft 63L, and thus the front end portion of the left adjustment shaft 63L can move in the up-down direction and can be moved in the horizontal plane defined by the three points described above. Therefore, by rotating the screw 111 of the adjustment member 101 in either direction, the front end portion of the left adjustment shaft 63L moves up or down, allowing the conveying unit 33 to be supported horizontally at four points (the front end portion and rear end portion of the right adjustment shaft 63R and the front end portion and rear end portion of the left adjustment shaft 63L) without twisting or bending.

In this way, the front side plate 13 and the rear side plate 17 of the housing 3 are examples of the one side plate and the other side plate according to the present disclosure, and the front end portion and the rear end portion of the reference shaft 25 are examples of the one end portion and the other end portion of the reference shaft in the present disclosure. In addition, the front end portion and rear end portion of the adjustment shaft 63 are examples of the other end portion and the one end portion of the adjustment shaft in the present disclosure. Moreover, the left support plate 71L and the right support plate 71R are examples of the other support plate and the one support plate in the present disclosure.

As described above, according to the present disclosure, even in a case in which the conveying unit 33 is inserted or removed through the opening 15 in the front side plate 13 of the housing 3, the conveying unit 33 can be supported horizontally at three points by providing the left and right support plates 71L, 71R that overlap a portion of the opening 15. Therefore, the conveying unit 33 can be supported by the housing 3 without twisting or distortion, and color deviation does not occur.

Next, an example of a method for mounting the conveying unit 33 in the housing 3 will be described. First, the conveying unit 33 is inserted into the upper hollow portion S1 through the opening 15 in the front side plate 13 of the housing 3. The rear end portions of the left and right adjustment shafts 63L, 63R of the conveying unit 33 are inserted into the left and right through holes 23L, 23R of the rear side plate 17 of the housing 3, respectively.

Next, the front end portions of the left and right adjustment shafts 63L, 63R are inserted into the lower through holes 83L, 83R of the left and right support plates 71L, 71R. Here, the washer 105 is attached in advance to the front end portion of the adjustment shaft 63L. In addition, the adjustment member 101 and the cover plate 115 are attached to the support plate 71L.

After that, the front end portions of the left and right reference shafts 25L, 25R protruding from the front side plate 13 of the housing 3 are inserted into the upper through holes 81L, 81R of the left and right support plates 71L, 71R. Thus, the left and right support plates 71L, 71R are suspended from the left and right reference shafts 25L, 25R. Due to the weight of the conveying unit 33 itself, the upper and lower through holes 81L, 83L of the left support plate 71L are aligned vertically, and the upper and lower through holes 81R, 83R of the right support plate 71R are aligned vertically. After that, the left and right support plates 71L, 71R are fastened to the housing 3. Thus, the conveying unit 33 is fixed on the same horizontal plane at three points (the front end portion and the rear end portion of the right adjustment shaft 63R and the rear end portion of the left adjustment shaft 63L).

Finally, the screw 111 of the adjustment member 101 is rotated in a predetermined direction to adjust the position of the front end portion of the left adjustment shaft 63L, thereby positioning the conveying unit 33 horizontally.

Note that in the embodiment described above, the front end portion of the left adjustment shaft 63L of the conveying unit 33 is adjustably supported by the adjustment member 101. In other words, the right adjustment shaft 63R is fixed to the housing 3, and thus the upstream end portion (right end portion) of the conveying unit 33 in the conveying direction is fixed to the housing 3. Generally, the recording medium is conveyed to the conveying unit 33 from a paper feeding device adjacent to the image forming apparatus. Therefore, by fixing the upstream end portion of the conveying unit 33 in the conveying direction to the housing 3, the receiving opening for the recording medium from the paper feeding device can be accurately positioned with respect to the paper feeding device.

However, the front end portion of the right adjustment shaft 63R or one of the rear end portions of the left and right adjustment shafts 63L, 63R of the conveying unit 33 may be adjustably supported by the adjustment member 101.

Note that the embodiment described above illustrates one aspect of the image forming apparatus according to the present disclosure, and the technical scope according to the present disclosure is not limited to the above-described embodiment.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a conveying unit configured to convey a recording medium along a predetermined conveying direction, and a housing configured to detachably support the conveying unit; wherein the housing comprises:

a pair of side plates arranged opposite to each other in a direction crossing the conveying direction;

two reference shafts fixed at a same height and spaced at a distance apart from each other in the conveying direction between the pair of side plates; and two support plates suspended from one end portion of each of the two reference shafts and fixed to one of the side plates;

the conveying unit comprises two adjustment shafts fixed at a same height and spaced the same distance apart from each other as the distance between the two reference shafts;

one end portion of each of the two adjustment shafts is supported by the other side plate at a certain distance in the vertical direction below the other end portion of each of the two reference shafts;

the other end portion of one of the adjustment shafts is supported by one of the support plates at a position in the vertical direction below the one end portion of one of the reference shafts and spaced apart from the one end portion of the one of the reference shafts; and the other end portion of the other adjustment shaft is supported by the other support plate so as to be able to move in an up-down direction.

2. The image forming apparatus according to claim 1, wherein one of the side plates has an opening through which the conveying unit is inserted and removed in a front-rear direction; and the two support plates overlap a portion of the opening.

3. The image forming apparatus according to claim 1, wherein the other support plate comprises:

an adjustment member supported so as to be rotatable in the up-down direction; and a screw configured to rotate the adjustment member relative to the support plate; and the other end portion of the other adjustment shaft is supported by the adjustment member, and can be moved in the up and down direction by rotating the screw to rotate the adjustment member.

* * * * *